(No Model.)
T. ARCHER.
MACHINE FOR GRINDING, SMOOTHING, AND POLISHING GLASS.
No. 286,672. Patented Oct. 16, 1883.
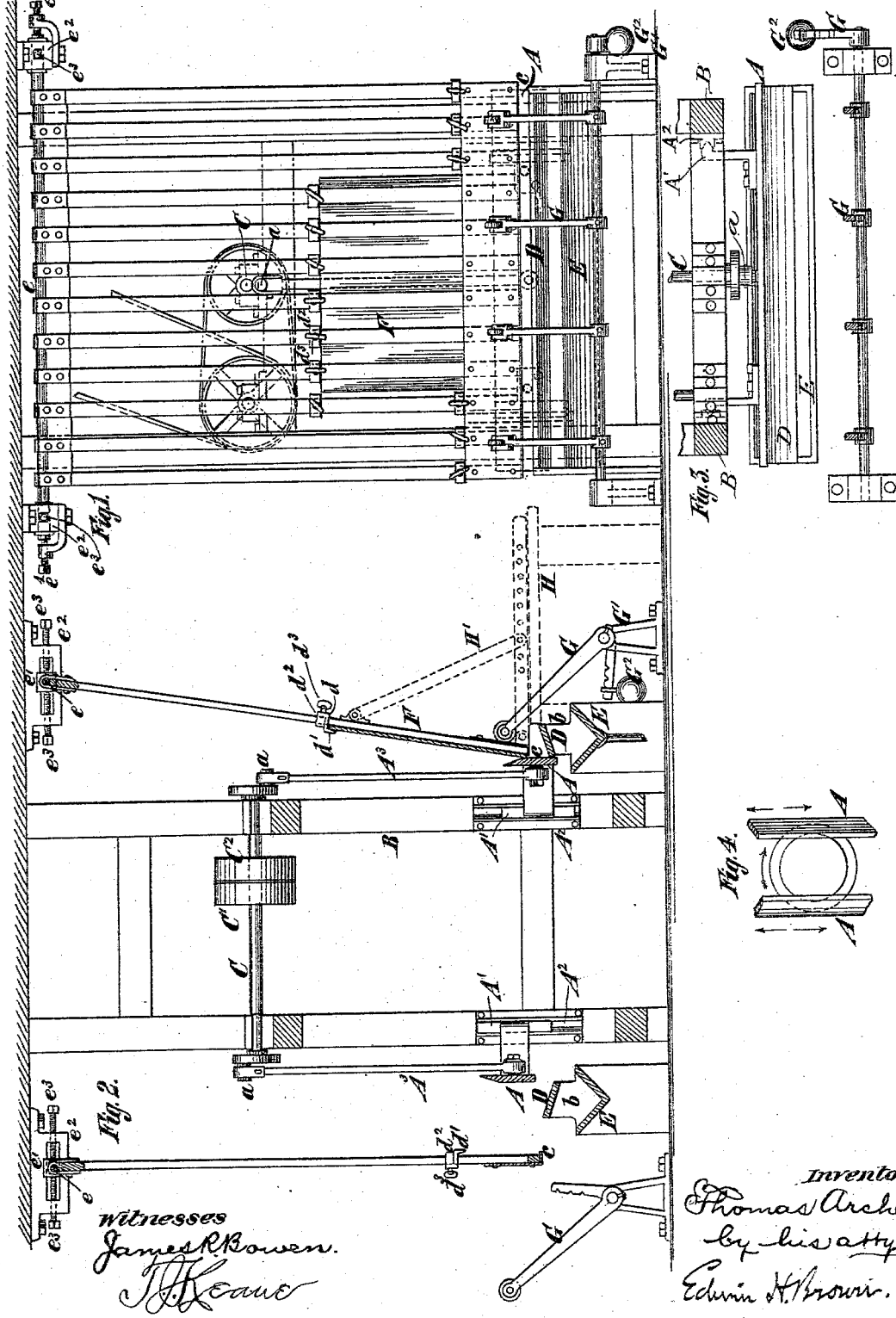

UNITED STATES PATENT OFFICE.

THOMAS ARCHER, OF NEW YORK, N. Y.

MACHINE FOR GRINDING, SMOOTHING, AND POLISHING GLASS.

SPECIFICATION forming part of Letters Patent No. 286,672, dated October 16, 1883.

Application filed February 5, 1883. (No model.)

*To all whom it may concern:*

Be it known that I, THOMAS ARCHER, of New York, in the county and State of New York, have invented a new and useful Improvement in Machines for Grinding, Smoothing, and Polishing Glass, of which the following is a specification.

The object of my improvement is to produce a machine for grinding, smoothing, and polishing glass without the objections which pertain to the use of rotary wheels.

The improvement consists in the combination, in a machine for operating upon glass, of a reciprocating bar and a holder supported from above, so as to present the glass to the bar, and having a pivotal connection with its support, whereby glass of different thicknesses may be properly presented to said reciprocating bar.

The invention also consists in other novel details of construction and combinations of parts in a machine of the kind above described.

In the accompanying drawings, Figure 1 is a side view of a machine embodying my improvement for operating on glass. Fig. 2 is a sectional end view of the same. Fig. 3 is a plan or top view of one end of the same, and Fig. 4 is a detail view illustrating a modification of certain parts of the machine.

Similar letters of reference designate corresponding parts in all the figures.

A designates bars, which may be made of iron and which are arranged one on each side of the machine, and connected to cross-heads A', which are supported in vertical slide-ways A², arranged upon the frame B of the machine. These bars or their cross-heads are connected by rods A³ to cranks $a$ upon a shaft, C. Rotary motion may be imparted to this shaft by a belt upon a pulley, C'. The shaft is provided with an idler-pulley, C², onto which the belt may be slipped when it is desired to stop the shaft. I have shown the cranks $a$ reversely set, and it is advantageous to so arrange them as the weight of one of the bars A, and its cross-head and rod descending will counterbalance the weight of the other bar and its appurtenances ascending. The bars A reciprocate upwardly and downwardly in contact with or in close proximity to inclined shelves D, on which is arranged emery, corundum, or other material used in operating upon the glass. This material, in a powdered condition and wet with water or other liquid, is placed upon the shelves, and by its gravity is fed down the shelves to the faces of the bars A. It adheres to the faces of the bars, and hence is carried by the bars to the glass on which the bars operate. The shelves are shown as erected on standards $b$, over troughs E; hence any material dropping from the shelves will be caught in the troughs.

F designates holders for the glass to be operated upon. Each consists of a frame adapted to receive the glass, and supported by a number of pendent arms, so that it may be swung toward the bars A. As shown, the frame consists of a ledge, $c$, upon which the lower end of the glass rests. On the pendent arms are devices $d$, severally consisting of collars $d^2$, fitting said arms, and provided with flanges $d'$, adapted to overlap the upper edge of the glass. These devices $d$ may be secured in different positions by set-screws $d^3$, extending through the collars $d^2$ and impinging against the pendent arms. Thus provision is afforded for adjusting the top bar to suit glass plates of different sizes. If the glass to be operated upon is very thin, and it is desired to form upon its edges a bevel extending to the back or nearly to the back, I may secure it by clamps, acting upon it close to the sides, instead of securing it at the top and bottom, as just described. The pendent arms, whereby the frame is supported, are hung on a shaft, $e$, which is journaled in boxes $e'$, adapted to slide along housings $e^2$, nearer to or farther from the frame B of the machine. Set-screws $e^3$ serve to adjust the boxes $e'$ along the housings, and to maintain them in positions to which they may be adjusted. By adjusting this shaft $e$ relatively to the frame B of the machine, the angle at which the glass plate in the frame will be presented to the bars A may be varied. The housings $e^2$ may be attached to a ceiling or other suitable support. The shaft $e$ may be adjusted lengthwise into different positions to afford facility for shifting the frame laterally to present the glass held in the frame most advantageously to the bars A. Set-screws $e^4$ constitute convenient means for effecting this adjustment of the shaft and for holding it in the different positions into which it may be adjusted.

G designates levers fulcrumed to standards G', near the troughs E. One arm of each of these levers bears against the back of the adjacent glass-holder frame, and preferably is provided with an anti-friction roller, where it acts upon the same. The other arm has affixed to it a weight, G², which preferably is capable of adjustment into different positions, so as to cause more or less pressure to be exerted upon the glass-holder frame. I have shown the weight as provided with a ring or loop surrounding the arm of the lever with which it is combined, and as adapted to be engaged with different notches in said arm, in order that it may be maintained in any position in which it is placed upon the arm. The lever, by bearing against the glass-holder frame, holds the glass against the adjacent bar A with any desired pressure. Set-screws or other devices may be used in lieu of the levers, and for the same purpose.

In lieu of employing a holder of the kind described, I may employ a frame, such as is comprised in the holder, and rest its lower edge upon a table, H, (shown in dotted outline.) In such case the upper edge of the frame may be supported by a leg, H', pivoted to the upper part of the frame and to the table. When this expedient is resorted to the leg H' will be so made as to be capable of being secured in different positions to the table, so that the glass may be presented to the adjacent bar A at different angles. The lower end of the frame may be actuated in various ways to press the glass against the adjacent bar A. For instance, a weight attached to a cord passing over a pulley, arranged nearer to the frame B of the machine than is the frame, would subserve this purpose.

Obviously the bars A may be reciprocated in the direction of their length, instead of transversely to their length, providing the shaft C were arranged opposite their ends and the rods A³ properly arranged. Any emery, corundum, or like material, might then be fed upon the bars near the upper edge. If desirable, the bars A may have their operative faces transversely convexed to produce a concave molding, or concaved, to produce a convex molding at the edge of the glass plate. In such case they may be supported by arms extending from a rock-shaft, which will reciprocate them in an arc of a circle concentric with the shaft. The rods A³ can then be connected with arms on the rock-shafts, so as to transmit a rocking motion thereto. Thus I provide for reciprocating the bars either in a rectilinear direction or in an arc-shaped path.

The bars A may be used for roughening glass or for smoothing it, and may have their surfaces modified or made of any desirable material for this purpose, or may have emery, corundum, or analogous material of different coarseness used with them. If desirable, the bars may be faced with any soft material, so that they may polish the glass presented to them. The bars B are designed to extend the whole length of the surface to be operated upon, so as to operate upon it all at one and the same time.

It is much more desirable to operate upon glass with a reciprocating bar than with a wheel, because less care is required to produce a uniform surface, less speed of the working parts is necessary, and the throwing of the pulverized material used in grinding, due to the centrifugal force generated by a rapidly-rotating wheel, is obviated.

If desirable, I can operate upon a rotary disk by rotating the same opposite reciprocating bars, arranged at angles to each other, and adapted to operate with a reciprocating movement, as shown in Fig. 4. If these bars are made resilient, I can operate on ellipses.

What I claim as my invention, and desire to secure by Letters Patent, is—

1. In a machine for operating upon glass, the combination of a reciprocating bar, and a holder supported from above, so as to present the glass to the bar, and having a pivotal connection with its support, whereby glass of different thicknesses may be properly presented to the reciprocating bar, substantially as specified.

2. In a machine for operating upon glass, the combination of a reciprocating bar, and a holder for presenting the glass to the bar, supported from above by means which may be moved nearer to or farther from the plane in which the face of the bar operates, whereby the glass may be presented at different angles, substantially as specified.

3. In a machine for operating upon glass, the combination of a reciprocating or vibrating bar, a holder suspended from above for presenting the glass to the bar, and means, preferably consisting of a weight acting on the holder, so as to press the glass against the bar, substantially as specified.

4. In a machine for operating upon glass, the combination of a reciprocating or vibrating bar, a holder suspended from above for presenting the glass to the bar, a lever impinging upon the holder, and a weight on the lever for causing the lever to press on the holder and force the glass against the bar, substantially as specified.

THOMAS ARCHER.

Witnesses:
JAMES R. BOWEN,
T. J. KEANE.